April 7, 1970   S. L. BLACK   3,505,075
METHOD AND APPARATUS FOR PRODUCING FROZEN CARBONATED BEVERAGE
Filed May 1, 1968

INVENTOR
Stewart L. Black

BY Schmidt, Johnson, Hovey, Williams & Bradley
ATTORNEYS.

United States Patent Office 3,505,075
Patented Apr. 7, 1970

3,505,075
METHOD AND APPARATUS FOR PRODUCING FROZEN CARBONATED BEVERAGE
Stewart L. Black, Lees Summit, Mo., assignor to The Vendo Company, Kansas City, Mo., a corporation of Missouri
Filed May 1, 1968, Ser. No. 725,828
Int. Cl. A23l 1/26; F25c 7/00
U.S. Cl. 99—28                                  13 Claims

ABSTRACT OF THE DISCLOSURE

A method and apparatus for preparing a frozen slush beverage wherein ice in chunk form admixed with a flavoring agent therefor is reduced to a finely divided state in an atmosphere of a pressurized gas such as carbon dioxide and under conditions causing a part of the gas to be absorbed by the mixture and thus produce the frozen beverage. The chunk ice and flavoring agent are maintained under the pressurized atmosphere of said gas in a closed receptacle and stirred with a cutter blade rotated at a sufficiently high speed to quickly reduce the ice to finely divided form. A portion of the gas is absorbed by the flavoring agent and water resulting from partial melting of the ice.

---

Figure 1:
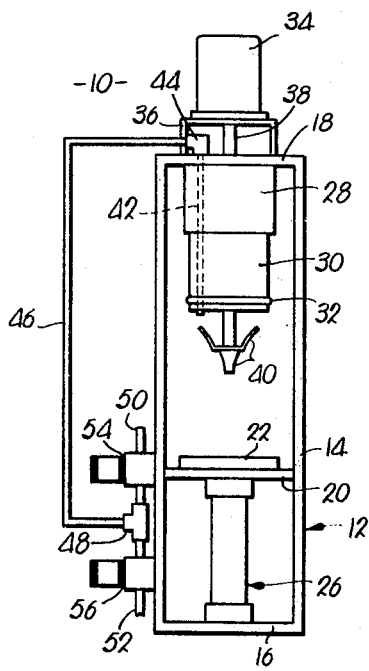

The invention relates to a novel method and apparatus for preparing a frozen beverage in slush form and which comprises finely divided ice combined with a liquid taste enhancing composition therefor that includes flavoring agents as well as a soluble, food grade gas such as carbon dioxide dissolved in the liquid.

Slush ice beverage machines have come into recent use but have heretofore been constructed along lines generally simular to commercial scale ice cream making machines that have been available for a long time. These ice cream making machines have usually been provided with a horizontal freeze chamber which receives the mix to be frozen and has a beater therein rotatable about a horizontal axis. The vanes of the beater serve to not only remove the thin layer of frozen material from the interior wall of the freeze chamber as the mix freezes thereon, but also whips air into the frozen product to improve the consistency and flavor thereof. The amount of air whipped into the frozen product and which is usually termed overrun, is a function of many factors including the speed of rotation of the beater, the temperature within the freeze chamber, the time of whipping, and the ingredients which are combined to make up the final frozen product. The use of a horizontal freeze chamber not only adds to the efficiency of the freezing and whipping process but also makes it easier to introduce the mix into one end of the chamber and remove the frozen product from the opposite end thereof.

Similar machines have found use in the preparation of frozen beverages in slush form by the addition to the basic equipment of apparatus for introducing flavoring syrup into a quantity of water which is then directed into the freeze chamber where it remains until frozen to a proper consistency and degree of overrun before being in condition for dispensing from the usual gate valve provided at the outlet end of the chamber. The syrup or flavoring agent added to the water serves to lower the freezing point thereof sufficiently that although a thin film of the mix is formed on the walls of the freezing chamber and scraped therefrom by the beater, the machine does not freeze up as would be the case if water alone were introduced into the machine.

Machines of the type using a freeze chamber and beater to whip the product have recently been constructed to maintain an atmosphere of carbon dioxide in the chamber insofar as possible to provide a degree of carbonation in the frozen slush beverage. However, even under the best of conditions, the amount of actual dissolved carbon dioxide in the product is limited and as a result, the beverage produced in a machine of this type tends to taste flat unless rather elaborate steps are taken to maintain the carbonation level of the frozen beverage at a desirable concentration.

Most importantly though, machines for producing slush carbonated beverages have been expensive insofar as initial cost is concerned, require frequent maintenance and do not put out a consistent product under varying operating conditions, particularly where the demand varies from time to time, and have required elaborate installation procedures as well as a considerable amount of floor space in the retail establishment. The problems with these machines have been compounded in those instances where frequent cleaning of the machine was not carried out in accordance with a rigid schedule.

Notwithstanding the disadvantages associated with slush beverage machines heretofore available, the differential between the cost of the ingredients making up the product mix against the sales price of the frozen beverage, has been sufficiently great that the operating problems encountered and the high initial cost of the machine have been largely ignored or accepted, because of the high return on the initial investment as well as the day-to-day operating expenses.

It is, therefore, the primary object of the present invention to provide apparatus and a novel process for preparing a slush frozen carbonated beverage utilizing entirely different principles and techniques that makes possible the employment of equipment significantly lower in cost than the freezing machines heretofore used, and which permits preparation of beverages of uniform and reproducible quality regardless of the demand on the machine.

It is another important object of the invention to provide an improved method and apparatus for preparing a slush frozen carbonated beverage wherein ice in chunk form is introduced into a receptacle therefor along with a quantity of a liquid flavoring agent such as syrup and the mixture stirred with a cutter blade rotated at high speed so as to quickly reduce the ice to finely divided form, and with an atmosphere of a gas such as carbon dioxide maintained on the mixture during stirring thereof so that the quantity of the gas which is absorbed by the liquid flavoring agent as well as the part of the ice which melts during reduction thereof to a fine state imparts a highly desirable taste, texture and appearance to the beverage.

Also an important object of the invention is to provide apparatus and a process for preparing a slush frozen carbonated beverage which is especially useful at a soda fountain or the like in a manner similar to the way in which malt mixers are presently in use.

Another important object of the invention is to provide apparatus for preparing a slush frozen carbonated beverage wherein the equipment may be produced at a considerably lower cost than modified ice cream machines heretofore employed for this purpose, since it is unnecessary to provide a plurality of refrigeration units as well as elaborate and complicated flow and pressure regulating devices which were necessary to assure introduction of desired amounts of ingredients into the freezing chamber for formation of the slush beverage therein. The object of providing simplified and therefore much less expensive apparatus for producing a frozen slush carbonated beverage is attained in the present invention by virtue of the fact that the major components of the equipment include only a chunk ice maker, a receptacle for receiving the ice and a flavoring agent therefor and having a cutter blade therein rotatable at a high speed, a shiftable plug for closing the receptacle after introduction of the ice and flavoring agent thereinto, and a source of gas such as carbon dioxide operably joined to the receptacle and under the control of a valve so that a pressurized atmosphere of the gas may be maintained within the receptacle during reduction of the ice to a finely divided state by high speed rotation of the cutter blade.

A still further important object of the invention is to provide a process and equipment for preparing a frozen slush carbonated beverage wherein, insofar as soda fountain use is concerned, the number of different beverages available is limited only by the variety of flavors at a particular location. Also, by the simple expedient of providing a plurality of the ice and flavoring agent receiving receptacles supplied by a single source of chunk ice and a common tank of carbon dioxide operably joined to the receptacles, two or more beverages may be prepared simultaneously. In this respect, it is to be appreciated that flavor variety is severely restricted in modified ice cream type machines since the size and cost of equipment with multiple freezing chambers tends to become prohibitive.

A further important object is to provide a method and apparatus as described which has the important advantage of permitting preparation of frozen slush carbonated beverages utilizing flavoring agents which contain artificial sweeteners rather than sugar and which has not heretofore been possible with modified ice cream type units. The presence of sugar in the liquid mix introduced into the freezer type machines allows the formation of a soft or slushy ice. On the other hand, the artificial sweetenings do not appreciably change the freezing characteristics of the liquid from that of water alone and thus tend to form a hard ice coating on the freezer wall. Therefore, it is a particularly significant object of this invention to provide a method and apparatus for producing a frozen slush carbonated beverage which is independent of the freezing characteristics of different liquid mixes and wherein the final product has improved appearance, texture, taste and stability over similar beverages heretofore available.

Modified ice cream type machines necessarily produce a relatively large amount of the frozen product each time the machine is started up and thus are not especially adapted for use in preparing beverages on a low demand basis wherein considerable periods of time may elapse before another product is withdrawn from the machine.

A very important object of the invention is to provide a method and apparatus for preparing a frozen slush carbonated beverage having a desirable stiff, smooth, uniform, finely divided texture that does not separate into liquid and foam layers in the time period normally required for a person to consume such beverage, and having carbon dioxide dissolved therein at a desirable level because of the way in which the chunk ice and flavoring agent mixture are stirred in a closed space under an atmosphere of the pressurized gas and with the space receiving the mixture being only fractionally greater than the initial volume thereof to cause maximum absorption of the gas into the liquid flavoring agent as well as the portion of the ice which melts during reduction thereof to a finely divided state.

It is a further object to expand the volume of space after the beverage is prepared to relieve gas pressure before opening the space to atmosphere. Thus, there will be no tendency for the beverage to eject violently with consequent spattering.

Finally, it is another important object of the invention to devise a method for producing a slushy frozen beverage product which can use B.t.u.'s in the form of ice and which can therefore be stored during slack demand periods (overnight, etc.) for handling peak sales and thus permit the use of smaller and less expensive refrigeration than formerly.

Figure 2:
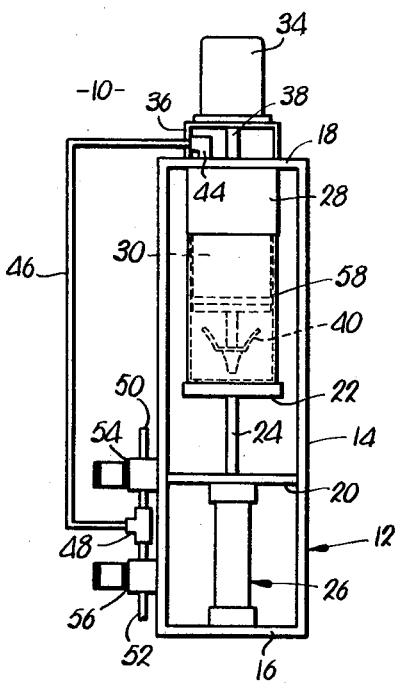

In the drawing:

FIGURE 1 is an essentially schematic representation of apparatus embodying the concepts of the invention and which is especially adapted for manual use such as at soda fountains or the like for preparation of individual frozen slush beverages where an independent source of ice in chunk form is available and with the apparatus being shown in its normal standby position prior to positioning of a receptacle thereon for breakup of the ice and admixture with a liquid flavoring agent added thereto; and FIG. 2 is a further schematic showing of the apparatus shown in FIG. 1 illustrating the normal actuated position of the components when the receptacle for the ice and the liquid flavoring agent has been shifted into a position where it is closed by the closure plug for the normally open top thereof.

The apparatus broadly designated 10 in the drawings is especially adapted for use, as for example, at soda fountains or the like wherein a supply of ice in chunk form is available.

Preferably, an ice maker is provided of the type having an upright, cylindrical evaporator housing, a rotatable auger which scrapes ice from the cold interior wall of the evaporator and forces the shaved ice through structure which forms the ice into chunks of generally rectangular shape and of the order of ¼ to ½ inch in size. These chunks are stored in a hopper associated with the evaporator and dispensed through a control gate that may be selectively actuated. It is to be understood though that other types of ice makers may be used if capable of producing ice of generally the particle size specified. Hard ice is preferred because only a small fraction thereof melts during reduction of the same to a finely divided state, notwithstanding the fact that apparatus 10 is used under ambient temperature conditions.

The frame 12 of apparatus 10 includes a series of upright members 14 which are joined by a bottom plate 16, a perforated top plate 18 and an intermediate support 20 which carries a receptacle platform 22 that is supported on the rod 24 of a pneumatically actuated, double acting piston and cylinder assembly 26 mounted on bottom plate 16 below support 20 in a generally vertical position.

Sleeve member 28 carried by and suspended from top plate 18 mounts a cylindrical plug 30 having an O-ring 32 around the circumference thereof adjacent the lower margin of the same. An electric motor 34 mounted on support structure 36 above top plate 18 is operably connected to a shaft assembly 38 extending through sleeve member 28 as well as plug 30 and carrying a cutter blade unit 40 on the lower extremity thereof below the circular lower face of plug 30. Motor 34 should be capable of rotating the unit 40 at a rate of several thousand revolutions per minute. Suitable bearing and rotating seal structure for the shaft 38 is provided in the lower part of plug 30 to withstand the gas pressure thereon notwithstanding the high speed of rotation of the shaft by motor 34.

Passage 42 through sleeve member 28 and plug 30 is connected to an elbow 44 on top plate 18 for communicating line 46 with passage 42. The line 46 leads to a T 48 having a solenoid vent valve 54 connected thereto for venting through line 50, and a gas supply line 52 which is adapted to be coupled to a pressure regulated gas supply vessel containing carbon dioxide or other suitable food grade, taste and texture enhancing, soluble gas under pressure. Solenoid control valve 56 in line 52 controls flow of gas from the source thereof to line 46 and thereby passage 42. The platform 22 is adapted to support a receptacle 58 in the nature of an open-top cup which is raised upon actuation of piston and cylinder assembly 26 into the disposition illustrated in FIG. 2 so that the cutter blade unit 40 is positioned in proximity to the bottom of receptacle 58. The blades of cutter unit 40 preferably have sharpened, longitudinally extending side edges and are pointed at the ends for most effective breakup of ice within receptacle 58. The ends of the blades also extend into relatively close proximity to the sidewall of the cup in the preferred form of the structure. Although not illustrated in detail in the drawing, it is to be understood that the parts at opposite ends of the cylinder of assembly 26 are connected to lines leading to a source of gas under pressure. Each of the lines leading to the parts of the cylinder preferably have solenoid actuated, multiple passage control valves therein which permit venting of the cylinder to the atmosphere as necessary during reciprocation of the piston in the assembly 26. The source of carbon dioxide under pressure connected to line 52 may be used to operate assembly 26 or a mechanically operated air compressor may be used for this purpose. Obviously, other mechanical or electromechanical mechanism may be used for shifting the platform 22 and plug 30 relatively. Control structure operably joined to the control valves for piston and cylinder assembly 26, as well as motor 34, permits selective control of the operation of apparatus 10.

In the use of apparatus 10, chunk ice and a liquid flavoring agent therefor are introduced into receptacle 58 while the latter is removed from platform 22. An especially palatable frozen slush carbonated beverage may be prepared in apparatus 10 by using a formulation wherein each batch contains 110 grams of chunk ice combined with 50 milliliters of a flavoring agent at room temperature and comprising a fountain type syrup to which may be added from 0 to 30 milliliters of water. Not only may the flavor of the beverage be changed at will, but non-sugar type flavoring agents such as those used in diet drinks and beverages may be used. The amount of water combined with the syrup is largely a matter of taste and economics rather than production of a satisfactory frozen beverage.

The receptacle 58 containing the admixture of ice and syrup is then placed on platform 22 immediately below plug 30. Thus, upon manual operation of the control structure for the piston and cylinder assembly 26, piston rod 24 is shifted upwardly to raise the platform 22 and as a consequence telescope the upper end of receptacle 58 over plugs 30 to close the open upper end of the cup. In the illustrated embodiment, the lower circular platform 22 is moved upwardly until the face of plug 30 is in relatively close proximity to the ice and flavoring agent mixture within receptacle 58. Obviously, since it is only required that there be relative movement between the receptacle 58 and its closure 30, the latter could be moved with respect to the platform 22 if desired upon suitable modification of the structure shown.

O-ring 32 engages the interior sidewall of receptacle 58 and is in fluid-tight sealing relationship thereto. During upward movement of the platform 22, the valve 54 is in disposition such that air within receptacle 58 is vented to the atmosphere via passage 42, line 46, the housing of valve 54 and vent line 50. During this period, valve 56 is closed. Thereupon, the condition of valves 54 and 56 is reversed to cause carbon dioxide or other gas from the supply vessel therefor to be directed into the interior of receptacle 58 through the circuit just traced so that an atmosphere of the carbon dioxide under a pressure of from 20–40 p.s.i.g. and preferably 35 p.s.i.g., is maintained on the composition within the interior of receptacle 58.

Motor 34 is next energized through a timer controlled circuit for a period of from about 5 to approximately 15 seconds to rotate the cutter blade 40 at a speed of several thousand revolutions per minute to reduce the ice in receptacle 58 to a finely divided state. Ten seconds has been found to be entirely adequate in this respect at a cutter speed of 6,000 r.p.m. The time and speed of rotation should be correlated to give the most desirable product not only from the standpoint of taste and appearance, but also the ability of the beverage to retain the preferred consistency throughout the time period required for a person to consume the product. It is to be recognized though that the time required to reduce the ice to a desired finely divided state is a function of the quantity of ice introduced into receptacle 58 as well as the speed of rotation of cutter unit 40. Upon cessation of rotation of the cutter blade 40, the control valve 56 is returned to the initial position thereof to cut off flow of gas to the receptacle 58. Subsequently, the platform 22 is lowered as rod 24 is returned to its initial standby condition as shown in FIG. 2. During the lowering of the receptacle 58, the interior volume thereof gradually increases to thereby permit the frozen slush beverage in cup 58 to undergo expansion. An overrun of about 50% is obtained in accordance with the preferred operating conditions set forth. An overrun of from 0–60% may be obtained depending on gas pressure. The receptacle 58 may then be removed from platform 22 and the beverage poured into a drinking cup.

In the preferred apparatus 10 the motor 34 is normally de-energized, the platform 22 is maintained as shown in FIG. 1 and the valves 54 and 56 are closed. The valve 54 is opened before the assembly 26 is operated to move cup 58 upwardly. When cup 58 is sealed in mixing position, valve 54 is closed and valve 56 is opened. Then motor 34 is operated for a controlled interval.

It is to be understood that if desired, a disposable cup may be placed inside of receptacle 58 and the entire cycle described above carried out in the same way, thus facilitating dispensing of the product and minimizing the cleanup required. If beverages of different flavors are to be prepared utilizing apparatus 10, the cutter blades 40 may be cleaned between batches in the same way as practiced in connection with malt mixing machines found at soda fountains or the like, wherein water may be placed in the receptacle 58 and the latter moved into a position where the cutter blades are immersed in the water. If desired, the motor 34 may be energized to cause the cutter blade unit 34 to rotate in the water.

Emulsification and stabilizing materials may be added to the flavoring agent if desired to increase the stability of the foamed beverage and impart a creamier appearance to the product. For example, addition of unflavored, plain gelatin to the flavoring composition has a beneficial effect on the appearance and stability of the frozen composition. Good results have been obtained by using approximately 7 grams in the quantity of flavoring agent used to prepare 115 drinks.

Although the process and apparatus described has particular application to the preparation of carbonated frozen slush beverages, it is to be understood that other food grade pressurized gases or air may be substituted for carbon dioxide to provide a suitable texture for other types of beverages. An exemplary gas in this respect is octafluorocyclobutane sold by E. I. du Pont d'Nemours and Co. under the trademark of Freon 318. In this instance the gas pressure maintained on the ice and syrup combination during stirring thereof should be about 20 p.s.i.g. Nitrous oxide is another gas which may be used in this application.

Having thus described the invention, what is claimed as new and desired to be secured by Letters Patent is:

1. A method of preparing a frozen carbonated slush ice beverage comprising the steps of:
   admixing a flavoring agent containing syrup with a quantity of discrete pieces of ice;
   confining the ice and said flavoring agent in a closed, unrefrigerated space;
   reducing the ice to a relatively finely divided state in said space while admixed with the agent and while allowing partial melting of the ice; and
   maintaining an atmosphere of carbon dioxide under pressure on the mixture during reduction of the ice to said finely divided state, said ice reduction being carried out under conditions causing carbon dioxide to be absorbed by the mixture to produce said carbonated beverage.

2. A method as set forth in claim 1 wherein is included the step of imparting cutting forces at a high rate of speed to the ice in said space for a sufficient period of time only to reduce the ice to said finely divided state.

3. A method as set forth in claim 1 wherein is included the step of maintaining said space at substantially ambient temperature prior to introduction of the ice thereinto.

4. A method as set forth in claim 1, wherein is included the step of introducing ice in relatively hard, chunk form into said space, each of said chunks having longitudinal and transverse dimensions not substantially exceeding about ½ inch, but of significantly greater size than the particles of ice remaining after reduction of the size thereof in said space.

5. A method as set forth in claim 1, wherein is included the steps of maintaining the carbon dioxide under pressure in said space during reduction of the ice to said finely divided state, and then closing off the source of carbon dioxide and expanding the space before opening the same to the ambient atmosphere to permit removal of the frozen carbonated beverage therefrom.

6. A method as set forth in claim 5, wherein is included the step of maintaining the carbon dioxide under a pressure of at least about 20 p.s.i.g. in said space during reduction of the ice to said finely divided state.

7. A method as set forth in claim 1, wherein is included the step of rotating a cutting blade through the mixture of said ice and the agent for a time and at a rate to only reduce the ice to said finely divided state.

8. A method as set forth in claim 7, wherein is included the step of rotating the blade through the mixture of said ice and the agent at a speed of several thousand revolutions per minute.

9. A method as set forth in claim 8, wherein is included the step of rotating the blade through the mixture of said ice and the agent at a speed of about 6,000 r.p.m. for a time period not exceeding about 15 seconds.

10. A method as set forth in claim 1, wherein is included the step of confining the mixture of said ice and the agent in a closed space having an effective volume only fractionally exceeding the total volume occupied by the ice and said agent prior to reduction of the ice to said finely divided state.

11. A method as set forth in claim 1, wherein is included the steps of providing an open-ended receptacle and a closure for the open end thereof, introducing the ice and said flavoring agent into the receptacle through said open end thereof, then moving the receptacle and closure relatively to bring the closure into closing relationship to the open end of the receptacle while venting the interior of the receptacle to the ambient atmosphere, said closure being moved toward the ice and flavoring agent in the receptacle until the volume of the space remaining therein only fractionally exceeds the effective volume of the ice and said agent, then discontinuing venting of the receptacle space to the atmosphere, introducing carbon dioxide under pressure into said space in the receptacle, stirring the ice and said agent under the carbon dioxide atmosphere at a rate and for a time only to reduce the ice to said finely divided state to produce said beverage, thereafter moving the receptacle and closure relatively to shift the closure away from the beverage to an extent to permit expansion of the beverage before the space in the receptacle is exposed to the atmosphere, and then continuing relative movement of the closure and the receptacle to move the closure out of said open end of the receptacle.

12. A method of preparing a frozen slush ice beverage comprising the steps of:
   admixing a flavoring agent containing syrup with a quantity of discrete pieces of ice;
   confining the ice and said flavoring agent in a substantially closed unrefrigerated space;
   maintaining an atmosphere of a food grade soluble gas on the mixture of ice and said flavoring agent while confined in said space; and
   reducing the ice to a relatively finely divided state while admixed with the agent in said space and under conditions causing a part of said gas to be absorbed by the mixture to thereby produce said frozen beverage.

13. A method as set forth in claim 12, wherein is included the step of maintaining an atmosphere of pressurized octafluorocyclobutane in the space during reduction of the ice therein to said finely divided state and while allowing partial melting of the ice.

References Cited

UNITED STATES PATENTS

| | | | |
|---|---|---|---|
| 2,422,709 | 6/1947 | Wiczer | 62—1 X |
| 3,333,969 | 8/1967 | Mitchell et al. | 99—192 |
| 3,359,748 | 12/1967 | Booth | 62—342 X |

WILLIAM E. WAYNER, Primary Examiner

U.S Cl. X.R.

62—306, 342; 99—136